United States Patent
Brown

(10) Patent No.: US 6,828,005 B2
(45) Date of Patent: Dec. 7, 2004

(54) WEAR-RESISTANT COMPOSITE AND METHOD FOR PRODUCING THE COMPOSITE

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 6 days.

(21) Appl. No.: 09/846,133

(22) Filed: May 1, 2001

(65) Prior Publication Data

US 2002/0012769 A1 Jan. 31, 2002

Related U.S. Application Data

(60) Provisional application No. 60/209,244, filed on Jun. 5, 2000.

(51) Int. Cl.$^7$ ................................................. B32B 3/30
(52) U.S. Cl. ........................ 428/141; 428/142; 428/143; 428/144; 359/536; 359/539; 359/541; 359/551
(58) Field of Search ................................ 428/141, 142, 428/143, 144, 147, 908.8; 359/536, 539, 541, 551, 515, 534, 535, 538, 552, 553

(56) References Cited

U.S. PATENT DOCUMENTS

| | | | |
|---|---|---|---|
| 4,950,525 A | * 8/1990 | Bailey | 156/276 |
| 5,356,670 A | 10/1994 | Briggs et al. | 427/410 |
| 5,514,441 A | * 5/1996 | Pohto et al. | 359/536 |
| 5,714,223 A | * 2/1998 | Araki et al. | 428/68 |
| 5,719,237 A | 2/1998 | Rehfuss et al. | 525/419 |
| 5,726,244 A | 3/1998 | McGee et al. | 525/78 |
| 5,812,316 A | * 9/1998 | Ochi et al. | 359/530 |
| 5,824,734 A | 10/1998 | Yang | 524/555 |
| 5,882,771 A | * 3/1999 | Klein et al. | 359/529 |
| 5,922,398 A | 7/1999 | Hermes et al. | 427/137 |
| 5,941,655 A | * 8/1999 | Jacobs et al. | 404/14 |
| 5,947,632 A | 9/1999 | Pirotta et al. | 404/9 |
| 5,977,263 A | * 11/1999 | Phillips | 428/334 |
| 5,988,822 A | * 11/1999 | Abe et al. | 359/541 |

FOREIGN PATENT DOCUMENTS

| | | |
|---|---|---|
| EP | 0 040 959 B1 | 9/1984 |
| WO | WO 96/22338 | 7/1996 |
| WO | WO 98/52698 | 11/1998 |

* cited by examiner

Primary Examiner—Harold Pyon
Assistant Examiner—Alicia Chevalier

(57) ABSTRACT

A composite on the surface of a substrate, and a method for producing the composite are disclosed. The composite includes a first coating, reflective beads, and a clear coating. The method for preparing the composite includes the stepwise application of coating compositions and reflective beads. The composite, which is wear-resistant and retroreflective, is useful as a traffic marking.

7 Claims, No Drawings

WEAR-RESISTANT COMPOSITE AND METHOD FOR PRODUCING THE COMPOSITE

CROSS REFERENCE TO RELATED PATENT APPLICATIONS

This is a non-provisional application of prior U.S. provisional application Ser. No. 60/209, 244 filed Jun. 5, 2000 now abandoned.

FIELD OF THE INVENTION

The present invention relates to a composite on the surface of a substrate, and methods for producing the composite. More particularly, the composite includes a first coating, reflective beads, and a clear coating. More particularly, the method for preparing the composite includes the stepwise application of a first coating composition, reflective beads, and a clear coating composition.

BACKGROUND OF THE INVENTION

Traffic marking coatings are one type of coating application for which reflectance and durability are particularly desirable. Traffic marking coatings are, for example, applied to roads, parking lots, and school playgrounds, the surfaces of which are typically concrete and asphalt. The resultant traffic markings instruct users and demarcate traffic lanes, parking spaces, and other restricted areas. As the replacement of solvent-borne paints continues in order to minimize air pollution, aqueous traffic marking compositions having a useful combination of dried film properties have been sought. Herein, the terms "traffic marking" and "traffic marking coating" are used interchangeably.

One of the most important properties of traffic markings is the level of retroreflectance provided by the markings to enhance nighttime visibility. Retroreflectance in a traffic marking is often provided by dropping or spraying reflective beads, usually glass beads, onto the freshly applied first coating. Such beads are thought to partially sink into the first coating, and partially remain above the surface of the first coating. Light from a vehicle's headlights is thought to strike the portion of the reflective bead protruding above the surface of the first coating, and to be reflected back toward the vehicle. Presently, traffic markings made from aqueous paints consist solely of the aqueous paint and the reflective beads. It is generally required that a traffic marking meet or exceed a minimum level of retroreflectance to be acceptable. While it is generally possible to achieve this minimum level of retroreflectance when the traffic marking is new, rapid diminution of retroreflectance with time is observed. This diminution occurs because the reflective beads tend to dislodge from the surface of the traffic marking as that surface is subjected to wear from, for example, the tires of automobiles and trucks. It is the object of the present invention to increase the durability of traffic markings by providing a new type of traffic marking which is more resistant to loss of reflective beads, and to loss of the retroreflectance they provide, when compared with current traffic markings.

U.S. Pat. No. 5,947,632 describes the use of reflective beads in traffic coatings. While the method described provides a retroreflective coating, that coating is vulnerable to rapid diminution of retroreflective properties due to abrasion of exposed surfaces of the reflective beads and due to dislodging of those beads from the coating.

U.S. Pat. Nos. 5,356,670, 5,719,237, and 5,726,244 disclose clear coatings that may be applied over pigmented coatings to enhance such characteristics as gloss and wear resistance. Unfortunately, these coating systems, which do not include reflective beads, require a curing step at high temperature during preparation. The required curing temperatures of at least 60° C., are not feasible for many applications, especially those involving the formation of traffic markings upon road surfaces.

I have, surprisingly, found that it is possible to prepare a wear-resistant retroreflective composite having a clear coating that prevents damage to and loss of the retroreflective beads, yet allows light from, for example, an approaching vehicle to impinge upon those beads and reflect backward toward the vehicle unimpeded. These wear-resistant retroreflective composities may be prepared on road surfaces as traffic markings.

SUMMARY OF THE INVENTION

The present invention relates to a composite on a surface of a substrate, wherein the composite includes:
a) a first coating including pigment and binder polymer;
b) reflective beads; and
c) a clear coating, including binder polymer.

The present invention also relates to a method for preparing a composite on a surface of a substrate, the method including the sequential steps of:
1) applying at least one first coating composition, including pigment, binder polymer, and water, to the surface;
2) applying at least one clear coating composition, including binder polymer and water, to the surface to which the first coating composition has been applied;
3) applying reflective beads simultaneously, or nearly simultaneously, with at least one of steps 1 or 2; and
4) allowing the composite to dry.

The present invention also relates to a method for preparing a composite on a surface of a substrate, the method including the sequential steps of:
1) applying at least one first coating composition, including pigment, binder polymer, and water, to the surface;
2) applying at least one clear coating composition, including binder polymer and water, to the surface to which the first coating composition has been applied;
3) applying reflective beads in at least one step between any two consecutive steps; and
4) allowing the composite to dry.

In an aspect of the present invention, the reflective beads are spherical, or approximately spherical glass beads.

In another aspect of the present invention, the composite includes at least one absorber,
wherein the absorber is selected from the group consisting of organic super absorbent polymers, ion-exchange resins, hollow sphere polymers, molecular sieves, talcs, inorganic absorbers, porous carbonaceous materials, non-porous carbonaceous materials, and mixtures thereof.

In a still further aspect of the present invention, the surface of the substrate is a road surface, and the composite is a traffic marking.

DETAILED DESCRIPTION OF THE INVENTION

The term "binder polymer" is used herein refer to polymers that are included in the coating compositions and that augment or participate in film formation. Binder polymers typically have Tg values in the range −10° C. to 70° C., because those having Tg values below −10° C. tend to have poor resistance to dirt pick-up and those having Tg values above 70° C. usually display diminished ability to form films. In certain applications, however, the lower limit for Tg can be even lower than −10° C. For example, the binder polymers used in roof coatings can have glass transition temperatures (Tgs) as low as −40° C. Used herein, "Tg" is an abbreviation for glass transition temperature. The glass transition temperature, Tg, of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20° C. per minute.

The first coating composition of the present invention includes one or more binder polymers, pigments, and water. The first coating composition may also include other formulation ingredients. The clear coating composition includes one or more binder polymers, and may also include other formulation ingredients. The binder polymers used for the aqueous first coating and clear coating may be the same or different.

It is an important property of the clear coating that a substantial portion of the visible light impinging upon it be able to pass through it without either being absorbed or scattered from its original path. For example, light from the headlights of an approaching automobile may pass through the clear coating of a traffic marking of the present invention until it reaches a reflective bead. The reflective bead then redirects the light backward through the clear coating and toward the eye of the automobile's driver. If a substantial amount of the light is either absorbed or scattered by the clear coating, the traffic marking will not appear bright to the motorist. Measurement of percent visible light transmission is a reliable way to determine the ability of a coating to allow the unimpeded passage of visible light. Percent visible light transmission is determined by comparing the intensity of light incident upon the coating with the intensity of that light once it has traversed the coating. For example, an aqueous coating composition is drawn down onto a glass slide and allowed to dry. A detector and light source are then positioned on opposite sides of the glass slide. The light source is further positioned so that the beam of visible light is oriented exactly perpendicular to the surface of the coating. The detector is set to detect only the light that is scattered by an angle of 2.5 degrees or less. The percent (%) visible light transmission is then calculated as follows:

% visible light=[photons of light counted in presence of the coating]×100% transmission [photons of light counted with coating]

Used herein, a coating is considered to be a "clear coating" if its percent visible light transmission at a coating thickness of 500 microns (m) is: 75% to 100%; preferably, 80% to 100%; more preferably 85% to 100%; and, most preferably, 90% to 100%.

The specific method by which a binder polymer is prepared is not of particular importance to the present invention. Binder polymers useful in the compositions of the present invention may be prepared via bulk and solution polymerization, and by aqueous dispersion, suspension, and emulsion polymerization, or any other method that would produce the desired polymer dispersed in water, with or without miscible co-solvent, or capable of being dispersed in water, with or without co-solvent. A preferred method for preparing the binder polymers to be used in the paint and clear coating compositions of the present invention is aqueous emulsion polymerization. Polymers thus prepared are usually stabilized by adding anionic, nonionic, cationic, or amphoteric surfactants, or by the incorporation of anionic or cationic moieties into the polymer itself during synthesis. The emulsion polymerization can be carried out by a number of processes such as those described in Blackley, D. C. *Emulsion Polymerisation*; Applied Science Publishers: London, 1975; Odian, G. *Principles of Polymerization*; John Wiley & Sons: New York, 1991; *Emulsion Polymerization of Acrylic Monomers*; Rohm and Haas, 1967.

The aqueous emulsion polymer useful in the composition and method of the present invention is an addition polymer formed by the polymerization of ethylenically-unsaturated monomers. The monomers from which the addition polymer is formed are ethylenically-unsaturated. The aqueous emulsion polymer composition may be selected and the polymer prepared by conventional techniques known to those of ordinary skill in the art. The polymer may contain, as polymerized units, one or more ethylenically unsaturated monomers. Examples of these ethylenically unsaturated monomers include: $C_1$–$C_{22}$ linear or branched chain alkyl (meth)acrylates, bornyl (meth)acrylate, isobornyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; N-butylaminoethyl (meth)acrylate, N,N-di(methyl)aminoethyl (meth)acrylate; monomers containing α,β-unsaturated carbonyl functional groups such as fumarate, maleate, cinnamate and crotonate; and (meth)acrylonitrile. Used herein, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Acid-functional monomers may also be present in the aqueous emulsion polymer of the present invention as polymerized units at preferably 0–10%, more preferably 0.5–5%, and most preferably 1–3%, all by weight, based on the weight of the dry emulsion polymer. All ranges for acid-functional monomers are inclusive and combinable. Acid-functional monomers useful in the present invention include, for example, (meth)acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid.

Optionally, a low level of a multi-ethylenically unsaturated monomer may be incorporated into the polymer to provide crosslinking. The level of multi-ethylenically unsaturated monomer may be 0–5% by weight, based on the weight of the dry emulsion polymer. The upper limit is typically determined by the point at which film formation becomes impaired. Useful multi-ethylenically unsaturated monomers include, for example, allyl (meth)acrylate, diallyl phthalate, 1,4-butylene glycol di(meth)acrylate, 1,6-hexanediol di(meth)acrylate, and trimethylolpropane tri (methyl)acrylate.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof Examples of anionic emulsifiers include sodium lauryl sulfate, sodium dodecyl benzene sulfonate, dioctylsulfosuccinate, sodium polyoxyethylene lauryl ether sulfate, and sodium salt of tert-octylphenoxyethoxypoly(39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tert-octylphenoxyethylpoly(39)ethoxyethanol, and nonylphenoxyethylpoly(40)ethoxyethanol.

Amphoteric surfactants may also be utilized solely, or in combination with anionic surfactants, nonionic surfactants, or mixtures thereof, to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. Useful classes of amphoteric surfactant include aminocarboxylic acids, amphoteric imidazoline derivatives, betaines, and macromolecular amphoteric surfactants. Amphoteric surfactants from any of these classes may be further substituted with fluorocarbon substituents, siloxane substituents, or combinations thereof. Useful amphoteric surfactants can be found in Amphoteric Surfactants, ed. B. R. Bluestein and C. L. Hilton, Surfactant Series Vol. 12 Marcel Dekker NY, N.Y. (1982).

Alternatively, all, or a portion, of the surfactant activity may be provided by initiator fragments, such as those of persulfates, when the fragments become incorporated into the polymer chain.

Incorporating monomers bearing ionic groups into the polymer chain is yet another alternative method of stabilizing the emulsion polymer system. Those monomers bearing ionic groups include the acid-functional monomers described herein above.

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof. Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe (III) and ammonium persulfate/sodium bisulfite/sodium hydrosulfite/Fe (III). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

The invention may also be practiced using a solvent soluble or water soluble polymer. When this is desired, the polymer may be prepared directly in water if the monomer mix is water soluble or, as is most often the case, the polymerization solvent is a water miscible solvent such as isopropanol, butyl cellosolve, propylene glycol, etc. In this case, water may be included in the polymerization mixture or post added after the polymerization is complete. In some cases, the polymer is prepared in a conventional organic solvent such as xylene or toluene. When organic solvent is employed with or without water, it is convenient to use a soluble organic free radical initiator such as azo-bis-isobutyronitrile, t-butyl-peroctoate, or benzoyl peroxide and whatever heat is convenient to assure smooth copolymerization. Another route to preparation of a water soluble polymer for this invention is to prepare a vinyl dispersion polymer having enough acrylic or methacrylic acid or other polymerizable acid monomer (usually greater than 10%) so that the emulsion polymer can be solubilized by addition of ammonia or other base. Water soluble polymers of this type are advantageously used as blends with conventional dispersion polymers. Systems of this type form a completely cured matrix when exposed to a free radical flux.

In another embodiment of this invention, an aqueous dispersion contains copolymer particles made up of at least two mutually incompatible copolymers. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

The emulsion polymerization techniques used to prepare such aqueous dispersions of copolymer particles made up of at least two mutually incompatible copolymers are well known in the art, and may be employed using the monoethylenically unsaturated monomers described above. It is sometimes advantageous to introduce some crosslinking or gel structure by the sequential polymerization process in the core via low levels of a multi-ethylenically unsaturated crosslinking monomer such as, for example, allyl methacrylate and others already described above. The lightly crosslinked core does not adversely affect film formation and does in some cases result in better coatings, particularly when reactive moieties able to participate in crosslinking reactions are concentrated in the shell.

The first coating composition, or the clear coating composition, may be free of organic solvent, or may contain coalescing solvents. In addition to binder polymers, either type of coating composition may contain typical coating additives such as defoamers, crosslinkers, catalysts, surfactants, stabilizers, anti-flocculants, tackifiers, coalescents, waxes, and anti-oxidants. The first coating composition, additionally, contains one or more pigments and, optionally, extenders and dyes. The clear coating composition may, optionally, contain extenders, provided those extenders do not significantly reduce the transmission of visible light through the coating.

Although not a requirement of the present invention, the first coating composition may be a "fast-drying" coating composition. Similarly, the clear coating composition may be a "fast-drying" coating composition. The term "fast-drying" is used herein to mean that a film of a so designated coating composition having a wet coating thickness of 330 microns displays a dry-through time of less than two hours at 90 percent relative humidity at 23° C. when applied without inclusion of absorbers. The term "fast-drying coating composition" refers to an aqueous dispersion of at least one binder polymer that, when applied to a substrate, forms a film having a dry-through time conforming to the definition of "fast-drying" just given. ASTM test methods are useful for determining drying rates. Especially useful is ASTM Method D 1640 directed at "Test methods for drying, curing, or film formation of organic coatings at room temperature".

There are several types of waterborne fast-drying coating compositions. Some of these fast-drying coating compositions are described hereinafter. Although the present invention is applicable to all of the fast drying binder compositions described herein, it is not limited to them, but rather is general for any fast drying coating compositions and the fast-drying waterborne coatings incorporating them, including the first coating compositions and clear coating compositions of the present invention. The terms "waterborne" and "aqueous" are used interchangeably herein.

Used herein, the term "polyamine functional polymer" refers to polymers bearing amine functional moieties either pendant to the polymer backbone or as an integral part of the backbone, or a combination of both pendant and backbone amine groups. As noted herein below, these polyamine functional polymers can be prepared from amine monomers, imine monomers, and monomers bearing functionality that can be converted to amine functionality.

Certain of the fast-drying coating compositions described in the next paragraphs have Tg (glass transition temperature) ranges for the binder polymer that are somewhat narrower than the range −10° C. to 70° C. disclosed for the binder polymers of the present invention. Such narrowed Tg ranges should in no way be construed as limiting the present invention. Any of these fast drying coating compositions may be prepared such that they contain binder polymer having Tg as low as −10° C. and as high as 70° C.

EP-B-0409459 discloses a fast drying aqueous coating composition including an anionically stabilized emulsion polymer having Tg no lower than 0° C., a polyamine functional polymer, and a volatile base in an amount such that the composition has a pH where substantially all of the polyamine functional polymer is in a non-ionic state, and wherein more than 50% by weight of the polyamine functional polymer will be soluble at pH values of 5 to 7 on evaporation of the volatile base. In the non-ionic state (i.e., deprotonated), polyamine interaction with the anionically stabilized emulsion and any other anionic ingredients which may be present in the composition is eliminated. The volatile base must be volatile enough to be released under air drying conditions. During film formation, the volatile base evaporates with the result that the amine moieties of the polyamine functional polymer become protonated to form ammonium moieties which, in turn, interact with the anionic ingredients to destabilize the coating composition and thereby accelerate drying.

WO 96/22338 discloses a fast-drying aqueous coating composition including from 95 to 99 weight percent of an anionically stabilized aqueous emulsion of a copolymer having a Tg of from −10° C. to 50° C., the copolymer containing two or more ethylenically unsaturated monomers, wherein from 0 to 5 weight percent of the monomers are α,β-ethylenically unsaturated aliphatic carboxylic acid monomers; from 0.2 to 5 weight percent of a polyimine having a molecular weight of from 250 to 20,000; and from 0.2 to 5 weight percent of a volatile base, wherein the composition has a pH from 8 to 11, and wherein a cast film of the composition loses the volatile base by evaporation to accelerate drying. The term "polyimine", used in the context of WO 96/22338, indicates that the polymer was prepared using imine monomers (e.g., ethyleneimine). The resultant polymer contains no imine functionality. Instead, the polymer contains amine functionality as part of the polymer backbone. It is this polyamine functional polymer that is deprotonated in the presence of volatile base. Upon formation of a film from the aqueous coating composition, the volatile base is released, allowing the amine moieties in the polymer backbone to protonate.

U.S. Pat. No. 5,922,398 discloses aqueous coating compositions containing a latex having pendant amine-functional groups, wherein such latex has a Tg equal to or greater than 0° C. and is capable of film formation at application temperatures, and an amount of base sufficient to raise the pH of the composition to a point where essentially all of the amine functional groups are in a non-ionic state. The amine-functionalized latexes have a number average molecular weights in the range of 1,000 to 1,000,000 and particle sizes that vary between 20 and 1000 nanometers. These latexes may be in the form of single, or multi-staged particles. The multi-staged particles include at least two mutually incompatible copolymers having any of a wide variety of morphologies, including core/shell, interpenetrating network, and multiple core. The latex polymer may also contain acid-functional moieties. When acid-function moieties are present, the weight ratio of amine-functional moieties to acid-functional moieties is generally at least 3 to 1. Both amine-functional moieties and acid-functional moieties may be incorporated into the same latex particle or into separate latex particles. Amine functional monomers polymerized to prepare amine-functional latex particles are used at a level of at least 2 percent by weight, based on total monomers. Acid functional monomers polymerized to prepare acid-functional latex particles are used at a level that is usually less than 10 percent by weight, based on total monomers. Latex particles are stabilized by surfactants, including anionic and non-ionic emulsifiers. The coating compositions of U.S. Pat. No. 5,922,398 use volatile base (e.g., ammonia) to stabilize the amine-functional moieties of the latex particles against interaction with surfactants during storage and application of films. Once applied, the films lose volatile base by evaporation, the amine-functional particles protonate to become ammonium-functional particles which, in turn, interact with surfactant, causing destabilization of the latex particles and acceleration of drying.

U.S. Pat. No. 5,824,734 discloses an improved fast drying coating composition particularly adapted for use as a traffic paint. This basic waterborne coating for traffic paint includes an aqueous emulsion containing an acrylic film forming polymer, a stabilizing system for the emulsion which is pH sensitive, and mineral pigment. The acrylic film forming polymer is a hydrophobic acrylate containing polymer. The hydrophobic monomers polymerized to produce the hydrophobic acrylate containing polymer include alkyl esters of acrylic or methacrylic acid having an alkyl ester portion containing between 1 to 12 carbon atoms. The hydrophobic acrylate containing polymer further incorporates from about 0.1 to 5% by weight of a secondary or tertiary amino acrylate and 0.1 to 5% by weight of crosslinkable monomers, such as N-alkylol acrylamides and N-alkylol methacrylamides, both weight percents based on total weight of polymer. The hydrophobic acrylate containing polymer should further contain less than 5 weight percent of hydrophilic monomers, based on total polymer. The aqueous dispersion is typically stabilized by a combination of anionic and non-ionic surfactants, and is pH sensitive. The pH is maintained above 7, preferably by addition of a volatile base like ammonia, until application of the coating onto a surface. Loss of base then effects collapse of the emulsion and the water is exuded from the amide- or amine-functional acrylate containing film forming hydrophobic polymer.

WO 98/52698 discloses a coating material including a substrate having a surface and a coating thereupon, wherein the coating is prepared by: a) contacting the surface of the substrate with a stable aqueous dispersion that contains a polymer having pendant strong cationic groups, and pendant weak acid groups; or b) contacting the surface of the substrate with a stable aqueous dispersion that contains a first polymer having pendant strong cationic groups, and a stable aqueous dispersion of a second polymer having pendant weak acid groups, the contact of the polymers with the surface being made in any order, or concurrently. When the stable aqueous dispersion contains a polymer having pendant strong cationic groups and pendant weak acid groups (i.e., coating "a" of WO 98/52698), it is a necessary condition that the surface of the substrate is, or is treated to be, sufficiently basic that the stable aqueous dispersion sets in less time than the time required for a latex that only contains pendant strong cation groups, or pendant weak acid groups, to set. The cationic groups are, for example, quaternary ammonium moieties, while the weak acid groups are, for example, carboxylic acid moieties. When coating "a" contacts the basic surface of the substrate, the base removes the proton from the weak acid, producing an anionic species that interacts with the cationic moiety to form crosslinks, destabilize the dispersion, and accelerate drying of the film. Cationic surfactants present in the aqueous dispersion are also rendered inactive by interaction with the anions generated from the weak acid groups. When coating "b" of WO 98/52698 is applied to a substrate, there is no requirement that the substrate be basic because one dispersion is cationically stabilized and the other is anionically stabilized such that, upon mixing, the oppositely charged surfactants interact to inactivate one another. Further, because the weak acid functional latex particles are anionically stabilized in coating "b", it is possible to adjust the pH of the aqueous dispersion such that the weak acid moieties are deprotonated and available to interact with cationic species upon film formation. The various routes to destabilization are possible contributors to accelerated drying of films.

Pigments are insoluble colorants that often scatter light as well as absorb selected wavelengths of light. Pigments for aqueous coatings include: rutile and anatase titanuim dioxide, zinc oxide, lead oxide, lithopone, antimony oxide, zirconium oxides, and iron oxides. Water insoluble organic dyes may also function as pigments in aqueous systems.

Many materials commonly called extenders may also perform as pigments. Extenders usually have low efficiency as pigments, but do give hiding performance in paints at concentrations in excess of the critical pigment volume concentration. Extenders useful as pigments include: silica, alkai and rare earth metal silicates, talc, clays, barium carbonate, barium sulfate, aluminum hydrate, diatomaceous earth, gypsum, mica, and chalk.

Glass beads, quartz beads, ceramic beads and mixtures thereof are collectively referred to herein as "reflective beads". Any of these types of reflective beads may be used in the present invention. However, glass beads are preferred. It is still more preferable that the glass beads are spherical, or nearly spherical. A primary function of the glass beads is to provide reflective properties to traffic markings. The particle size of glass beads is in the range $50\mu$ (micrometers) to $1500\mu$, preferably $80\mu$ to $1250\mu$, more preferably in the range of from $100\mu$ to $1000\mu$. Glass beads can be obtained from various commercial sources such as Potters Industries, Inc. (PQ Corporation), Swarco Industries, Inc., Minnesota Mining and Manufacturing Company (3M), and others. Typical glass beads useful for this application are those described in AASHTO Designation M 247–81 (1993), developed by the American Association of State Highway and Transportation Officials (Washington, D.C.). The beads will generally be applied at a rate of 0.72 kg/L to 2.9 kg/L or more of paint for night and adverse weather visibility.

The term "road" is used herein as a generic term and it includes any indoor or outdoor solid surface which is or may be exposed to pedestrians, moving vehicles, tractors, or aircraft continuously, constantly or intermittently. Some non-limiting examples of a "road" include highways, streets, driveways, sidewalks, runways, taxiing areas, tarmac areas, parking lots, rooftops, indoor floors (such as factory floors, floors inside shopping malls, etc), and playgrounds. The surface material may be masonry, tar, asphalt, resins, concrete, cement, stone, stucco, tiles, wood, polymeric materials and combinations thereof It is also within the scope of the invention to apply the coating over another one or more layers of fresh or aged coating or marking already applied on the surface.

The waterborne traffic marking system may be applied to roads, parking lots, and the like, typically to concrete and asphalt surfaces. The aqueous first coating composition and clear binder composition for the traffic-marking system of this invention may be applied by methods well known in the art such as air-assisted spray, airless spray, plural component spray, brush, and roller squeegee. The reflective beads may be applied by spraying or dropping the beads on the aqueous paint, before the clear coating is applied. Used herein the term "waterborne traffic marking system" includes the first coating composition, the reflective beads, and the clear coating composition.

The first coating composition may be applied at a wet film thickness of 1 to 50 mils (=25 to $1270\mu$, where $\mu$=micron, micrometer), and may be from 40% to 80% volume solids. Preferably, the wet film thickness is from 10 to 30 mils (250 to $760\mu$) and the volume solids are from 50% to 70%. The clear binder composition may be applied at a wet film thickness of 0.25 to 20 mils (=6 to $510\mu$), and may be from 10% to 50% volume solids. Preferably, the wet film thickness is from 1 to 6 mils (=25 to $150\mu$) and the volume solids are from 30% to 45%. The reflective bead may be any bead that is capable of reflecting visible light from a vehicle's headlights back to the vehicle. Preferably, the reflective beads are spherical, or approximately spherical glass or quartz beads with an average bead diameter of 0.15 mm to 2 mm, more preferably from 0.5 to 1.6 mm. When the reflective beads are applied in a step after application of the last first coating composition, but before any steps of application of clear binder composition, the reflective beads should be applied while the first coating composition is still wet enough that the beads can sink partially into that first coating composition. Preferably, the ratio of the diameter of the reflective bead to the wet film thickness of the first coating composition is between 2.0 to 10.0, so that a substantial portion of the reflective bead remains above the surface of the aqueous paint. Preferably, the ratio of the diameter of the reflective bead to the dry film thickness of the clear coating is between 0.5 to 3.0, so that the reflective bead retains much of its ability to reflect light back to the oncoming vehicle after it is coating with the clear coating.

When reflective beads are applied to the surface of a layer of previously applied coating composition, either paint or clear, that surface should still be wet enough that the beads can sink partially into it.

After the composite has been applied to a substrate, the first coating composition and the clear coating composition are allowed to dry or are caused to dry. Drying to yield useful properties may take place at a convenient rate at ambient temperatures such as, for example, from 5° C. to 35° C.

In the methods of the present invention, reflective beads may be applied simultaneously, or nearly simultaneously, with any of the steps of applying either the first coating composition or the clear coating composition. Reflective beads may also be applied in a separate step between any two consecutive steps of applying the paint and clear coating compositions. Preferably, reflective beads are applied in one or more steps subsequent to the last step of applying the first coating composition. More preferably, reflective beads are applied in one or more steps subsequent to the last step of applying the first coating composition and prior to the last step of applying the clear coating composition. All of these ranges of ways to apply reflective beads are inclusive and combinable.

Although a reflective bead may be located anywhere within the composite of the present invention, it is preferred that at least a portion of the surface of each bead be free of any first coating, and that at least a portion of those free surfaces have only clear coating separating them from air, the remainder being in direct contact with air. More preferably, at least a portion of the surface of each bead is free of any first coating, and those free surfaces have only clear coating separating them from air. All of these ranges of locations of reflective beads within the composite are inclusive and combinable.

Absorbers suitable for use in the present invention are described in detail in U.S. Pat. No. 5,947,632. These absorbers are preferably water insoluble. However, it is possible for an absorber of the present invention to be effective even if a portion of that absorber is susceptible to dissolution upon addition to the aqueous system. "Water insoluble" is defined herein as having a solubility of less than 0.5 grams of the absorber per 100 grams of water at 20° C. More preferably, the solubility is less than 0.1 gram of the absorber per 100 grams of water at 20° C., and most preferably the solubility is less than 0.05 gram of the absorber per 100 grams of water at 20° C. All of these ranges are inclusive and combinable.

Many absorbers having liquid or gas absorption or adsorption properties may be used for the present invention. The absorbers should be able to adsorb and/or absorb small polar molecules like water, ammonia, $C_1-C_6$ alkyl amines, $C_1-C_6$ alkyl alcohols, or a combination thereof. It is preferred that an absorber is has a substantial number of polar sites per gram of absorber or per square meter of surface area and that these polar sites can interact or react with small polar molecules such as water, ammonia, $C_1-C_6$ alkyl alcohols, $C_1-C_6$ alkyl amines, and mixtures thereof. Examples of absorbers include organic super absorbent polymers, ion-exchange resins, hollow sphere polymers, molecular sieves, inorganic absorbents, porous carbonaceous materials, non-porous carbonaceous materials, and mixtures thereof. Not all such materials may be used for all applications. For example, where light color in the application is desired, carbonaceous materials may not be suitable in all instances because they are black.

The particle size of an absorber should be in the range of from $0.05\mu$ to $5000\mu$, preferably in the range of $10\mu$ to $1500\mu$, where $\mu$ denotes micron. In general, uniform distributions of all the solid components, including the absorber, are preferred.

The amount of an absorber or a mixture of absorbers used in the present invention is in the range 0.01 wt % to 90 wt %, based on the total dry weight of the composite. A preferred range is from 0.1 wt % to 70 wt %, more preferably from 1 wt % to 30 wt %. Key parameters to be considered in determining the amount of an absorber to be used include the amount of the binder polymer, the type of the binder polymer, the water content, the type of absorber, the properties of the absorber, the desired thickness of the film, the conditions (temperature, relative humidity, substrate, history of substrate surface, and combinations thereof) under which the coating compositions are applied, and other ingredients present in the final composition of the paint formulation, and combinations thereof.

Any ion exchange resin may be used as the absorber in the present invention. The term "ion exchange resin" is used interchangeably with "IER" herein. In particular, the IERs may have positive or negative ionic moieties, or combinations of positive and negative ionic moieties, attached to their polymer chains. Many ion exchange resins (IERs) in the acid or metal ion form may be used. For the present invention, a preferred IER comprises either a strong acid cation exchange resin or a weak acid cation exchange resin. Mixtures of IERs also may be used.

Ion exchange resins useful in the present invention are described in U.S. Pat. No. 5,947,632.

Examples of commercially available IER's which can be used for the present invention include: AMBERLYST™ 15, AMBERLYST™ 131 PDry, AMBERJET™ IR-120H, AMBERLITE™ IRC-84, AMBERLITE™ IRC-84SP, AMBERLITE™ IRC-96K, AMBERLITE™ IRP-64, AMBERLITE™ IRP-69, AMBERLITE™ XE-64W, AMBERJET™ 1200H, AMBERJET™ HP1110Na, NAFION™ NR50, and mixtures thereof.

Some IER's are translucent. This may be a desirable property. For example, if a some of these lighter colored translucent IERs are visible on the surface of the finished coating, light reflective properties can be enhanced. Thus, translucent IERs may either augment the reflective properties of glass beads used in traffic markings or reduce the amount of glass beads needed, thus reducing the overall cost of applying the paint.

IERs may also provide additional benefits such as anti-skid provided that they are used in the quantities and have the particle sizes as disclosed herein.

IER beads may be applied in dry form or they may contain water at levels as high as 95% by weight, based on total combined weight of the IER solids and the water contained in the IER. The preferred water content is 0 to 40%.

It is also within the scope of the present invention to use a mixture of different resins of the same structure type (different gellular resins or different macroporous types) or different types (one or more gellular types with one or more macroporous types). An example of a gellular IER is AMBERLITE® IRC-84SP and an example of a macroporous IER is AMBERLITE® IRC-64.

Absorbers can also be organic superabsorbing polymers (SAPs). The water-absorbent resins of this class heretofore known to the art include partially neutralized crosslinked polyacrylic acids (JP-A-55-84,304, JP-A-55-108,407, JP-A-55-133,413, U.S. Pat. Nos. 4,654,039, and 4,286,082), hydrolyzed starch-acrylonitrile graft polymers (JP-A-46-43,995 and U.S. Pat. No. 3,661,815), neutralized starch-acrylic acid graft polymers (JP-A-51-125,468 and U.S. Pat. No. 4,076,663), saponified vinyl acetate-acrylic ester copolymers (JP-A-52-14,689 and U.S. Pat. No. 4,124,748), hydrolyzed acrylonitrile copolymers or acrylamide copolymers (JP-A-53-15,959, U.S. Pat. Nos. 3,935,099 and 3,959,569), crosslinked derivatives thereof, crosslinked carboxymethyl cellulose (U.S. Pat. Nos. 4,650,716 and 4,689,408, and crosslinked polymer of cationic monomers (JP-A-58-154,709, JP-A-58-154,710, U.S. Pat. Nos. 4,906,717, 5,075,399, and EP 0304,143), crosslinked isobutylene-maleic anhydride copolymers (U.S. Pat. No. 4,389,513), and crosslinked copolymers of 2-acrylamide-2-methylpropanesulfonic acid with acrylic acid (EP 068,189), for example.

Examples of commercially available SAP materials include AQUALIC® CA (Nippon Shokubai Kagaku Kogyo Co., Ltd.). SAP's in both fibrous and particular forms may be used. SAP's in particulate form (as particles) are preferred. The range of suitable particle size is discussed elsewhere herein.

Yet another type of absorber includes materials like AMBERSORB™, activated carbons, carbon blacks, pyrolyzed polyacrylonitrile or other types of carbonaceous materials. AMBERSORB™ is a trademark of Rohm and Haas Company.

Molecular sieves, including many natural and synthetic zeolites which have liquid or gas absorption and/or adsorption properties, may be used as the absorber for the present invention. Synthetic zeolites are generally white and natural zeolites may be white, off-white, or colored. Off-white or colored molecular sieves or zeolites may be limited to applications where color of the coating is compatible or not important. Examples of molecular sieves include metal-containing or acid form zeolite or molecular sieve such as 3A, 4A, 5A, 10X, 13X, Y, ZSM-5, ZSM-11, beta, faujasite, erionite, SAPO-5, SAPO-11, SAPO-34, ALPO-5, and mixtures thereof. While the more hydrophobic type zeolites or silicas such as silicalite or high Si/Al atomic ratio (greater than 100) ZSM-5 may be used, they are not particularly preferred for the present invention.

Other inorganic materials such as aluminas, silica-aluminas or their mixtures also may be used alone or in conjunction with other disclosed absorbers. Examples include aluminas such as $\alpha$-alumina, $\gamma$-alumina, $\theta$-alumina, $\eta$-alumina, amorphous silica-aluminas, crystalline silica-aluminas, diatomaceous earth (such as CELITE™ or kieselguhr), and mixtures thereof. Material like kieselguhr also have been known to be useful as extenders by forming a mixture with the binder polymer prior to application of the paint. Magnesium silicates such as talc may also be used as absorbers.

The molecular sieves and other inorganic materials are available from a number of companies, including Mobil, Union Carbide, W. R. Grace, Aldrich, Johnson Matthey, and others.

Hollow sphere polymer particles are also useful as absorbers in the present invention. The hollow sphere polymer particles are also referred to herein as voided latex particles.

The voided latex particles useful in the invention may be prepared by conventional polymerization processes known in the art, such as those disclosed in U.S. Pat. Nos. 3,784,391; 4,798,691; 4,908,271; 4,972,000; published European Patent Application 0,915,108; and Japanese Patent Applications 60/223,873; 61/62510; 61/66710; 61/86941; 62/127336; 62/156387; 01/185311; 02/140272. Preferably, the voided latex particles are prepared according to U.S. Pat. Nos. 4,427,836; 4,469,825; 4,594,363; 4,880,842 and 5,494,971 and published European Patent Application 0,915,108. Voided latex particles, such as ROPAQUE™ OP-62, are available from Rohm and Haas Company of Philadelphia, Pa.

All ranges used herein are inclusive and combinable.

Glossary

"$\mu$"=micron, or micrometer (=$10^{-6}$ meter)

"nm"=nanometer (=$10^{-9}$ meter)

TAMOL™ 901 Dispersant, an ammonium salt of polyelectrolyte supplied by Rohm and Haas Company, Philadelphia, Pa. @ 30 percent by weight.

SURFYNOL™ CT-136 Surfactant, an acetylenic surfactant supplied by Air Products and Chemicals, Inc., Allentown, Pa.

DREW™ L-493 Defoamer supplied by Drew Chemical Company, Boonton, N.J.

TIPURE™ R-900 Titanium dioxide supplied by E. I. duPont de Nemours & Company, Wilmington, Del.

OMYACARB™ 5, Ground natural calcium carbonate, evaluated under ASTM D 1199, Type GC, Grade II having a number average particle size of 5.5 microns with maximum oil absorption No. of 10, supplied by Omya, Inc., Proctor, Vt.

TEXANOL™ Ester alcohol supplied by Eastman Chemicals, Kingsport, Tenn.

G-6720 (33.3% in $H_2O$) is 3-glycidoxypropyltrimethoxysilane available from United Chemical Technologies.

EXAMPLE 1

Preparation of aqueous emulsion polymer for use in either first coating composition or clear coating composition.

To 3583 g of deionized (DI) water under a nitrogen atmosphere at 90° C. were added 67.9 g sodium lauryl sulfate (28%), 547 g of monomer mix, 33 g sodium carbonate dissolved in 196 g DI water, and 24 g sodium persulfate dissolved in 98 g DI water to form a reaction mixture to which the following monomer mixture was then added over 3 hours at 81° C. along with a solution of 9.7 g sodium persulfate dissolved in 440 g DI water.

| Components of Monomer Mixture | Weight of Component in grams (g) |
| --- | --- |
| DI water | 3959 |
| Sodium lauryl sulfate (28% active) | 67.9 |
| butyl acrylate | 4332 |
| methyl methacrylate | 5045 |
| methacrylic acid | 124 |

At the end of the polymerization, 0.06 g FeSO4 in 40 g DI water, 7.8 g t-butylhydroperoxide in 88 g DI water and 2.9 g sodium sulfoxylate formaldehyde in 176 g DI water were added at 60° C. to the reaction product. Ammonium hydroxide was added to give a final pH=10.3, followed by addition of 26 g of a 37% formaldehyde solution. The resulting latex polymer had a solids content of 51.7% and an average particle diameter of 172 nm.

EXAMPLE 2

Preparation of aqueous emulsion polymer for use in a clear coating composition.

To 877 g of deionized (DI) water under a nitrogen atmosphere at 90° C. was added 15.4 g sodium lauryl sulfate (28%), 124 g of monomer mix, 7.6 g sodium carbonate dissolved in 45 g DI water, and 5.5 g sodium persulfate dissolved in 22 g DI water to form a reaction mixture to which the following monomer mixture was then added over 3 hours at 81° C. along with a solution of 2.2 g sodium persulfate dissolved in 100 g DI water.

| Components of Monomer Mixture | Weight of Component in grams (g) |
| --- | --- |
| DI water | 900.0 |
| Sodium lauryl sulfate (28% active) | 15.4 |
| butyl acrylate | 1188.0 |
| methyl methacrylate | 944.0 |
| methacrylic acid | 28.0 |
| n-dodecylmercaptan | 27.0 |

At the end of the polymerization, 0.01 g FeSO4 in 9 g DI water, 1.8 g t-butylhydroperoxide in 20 g DI water and 0.7 g sodium sulfoxylate formaldehyde in 40 g DI water were added at 60° C. to the reaction product. Ammonium hydroxide was added to give a final pH=10.2 followed by addition of 6 g of a 37% formaldehyde solution. The resulting latex polymer had a solids content of 51.1% and an average particle diameter of 174 nm.

EXAMPLE 3

Preparation of a polyamine for use as a rapid-set additive.

To a 2-liter reactor containing 600 g of deionized (DI) water under a nitrogen atmosphere at 60° C., 2.8 g of an aqueous solution of ferrous sulfate heptahydrate (0.15% by weight of solution) and 0.8 g of an aqueous solution of the tetrasodium salt of ethylenediamine tetraacetic acid (1% by weight of solution) diluted with 10 g DI water were added with stirring. A feed composed of 200 g 2-(3-oxazolidinyl) ethyl methacrylate (OXEMA) and 100 g DI water was added over a 2 hour period. Simultaneously, feeds composed of 2 g t-butylhydroperoxide (70 weight % active ingredient) dissolved in 23 g DI water and 2 g sodium sulfoxylate formaldehyde dihydrate dissolved in 23 g DI water were added over a 2 hour period. After completion of the feeds, the reaction was held at 60° C. for 30 minutes then 0.16 g of t-butylhydroperoxide (70 weight % active ingredient) dissolved in 10 g DI water was added. Fifteen minutes later, 0.1 g of t-butylhydroperoxide (70 weight % active ingredient) dissolved in 10 g DI water and 0.06 g sodium sulfoxylate formaldehyde dihydrate dissolved in 10 g DI water were added. Fifteen minutes later, the reaction mixture was cooled to room temperature. The final reaction mixture had a pH of 8.2, solids content of 17.6 weight %, and a Brookfield viscosity (spindle 2 at 60 rpm) of 30 cps.

EXAMPLE 4

Preparation of first coating compositions.

Aqueous first coating compositions (P1-P2) were prepared according to the following formulations. The ingredients were added in the order given under low shear laboratory mixing. After the addition of the OMYACARB™-5, stirring was continued for 15 minutes before the addition of the remaining ingredients.

TABLE 1

Ingredients for aqueous paints P1 and P2 for use in traffic marking systems.

| First coating Composition | P1 | P2 |
| --- | --- | --- |
| Emulsion polymer (solids as supplied) | 6054.0 g Example 1 | 6054.0 g Example 1 |
| Example 3 | 222.0 | 222.0 |
| TAMOL ™ 901 | 97.9 | 97.9 |
| SURFYNOL ™ CT-136 | 38.1 | 38.1 |
| DREW ™ L-493 | 27.1 | 27.1 |
| TIPURE ™ R-900 | 1361.0 | 1361.0 |
| OMYACARB ™ -5 | 10348.0 | 10348.0 |
| MeOH[a] | 408.0 | 408.0 |
| TEXANOL ™[a] | 319.0 | 319.0 |
| water[a] | 158.0 | 158.0 |
| DREW ™ L-493 | 47.7 | 47.7 |
| water | 100.0 | 100.0 |
| G-6720 (33.3% in H$_2$O)[b] |  | 187.6 |

[a]premixed prior to adding to paint
[b]added to paint just prior to use

EXAMPLE 5

Preparation of clear coating compositions.

Clear coating compositions (CC1–CC3) were prepared according to the following formulations. The ingredients were added in the order given under low shear laboratory mixing.

TABLE 2

Ingredients used in the preparation of clear coating compositions CC1 to CC3.

| Clear Coating Composition | CC1[a] | CC2 | CC3 |
| --- | --- | --- | --- |
| Example 1 | 3820.0 | 3820.0 |  |
| Example 2 |  |  | 3562.0 |
| Example 3 |  | 108.2 |  |
| butyl Cellosolve | 295.7 | 295.7 | 547.1 |
| butyl Carbitol | 98.6 | 98.6 | 182.4 |
| water |  |  | 182.4 |
| DREW ™ L-493 | 12.8 | 12.8 | 13.8 |
| water |  |  | 1375.0 |
| G-6720 (33.3% in H$_2$O)[b] |  | 68.4 |  |

[a]All weights are in grams (g).
[b]G-6720 is added to the coating composition just prior to use. G-6720 is 3-glycidoxypropyltrimethoxysilane available from United Chemical Technologies

EXAMPLE 6

Testing of durability of applied traffic marking systems.

Used herein, the term "traffic marking system", abbreviated "TMS", includes the first coating composition, clear coating composition, reflective beads, and other ingredients that are applied to the road surface. The traffic marking systems of this example are representative of the broader class of durable retroreflective coating systems which extends to applications beyond traffic marking on road surfaces.

Traffic marking systems, also designated "TMS" 1, 2, 3, and 4 herein, were applied to Route 611 near Doylestown, Pa. as transverse lines. Aqueous paints were spray applied with a conventional air spray gun at a wet film thickness of 15 mil. Immediately after application of the aqueous paints, reflective beads (L-511 VISIBEADS™ from Potters Industries) were sprayed onto the lines at a rate of 12 lbs of beads per gallon of applied paint. Immediately after application of the beads, the clear coatings were spray applied with a conventional air spray gun at a wet film thickness of 3 mils (76$\mu$). For the comparative systems, also designated "C.Ex" 1, 2, 3, and 4 herein, the clear coating was omitted.

Retroreflectance was measured with a Mirolux 12 reflectometer. Performance of the traffic marking systems of the present invention relative to the comparative examples is reported by measuring R vs. time, where $$R = (R_{tms}/R_{tms,0})/(R_{cex}/R_{cex,0})$$

$R_{tms}$ is the retroreflectance of the traffic marking system, $R_{tms,0}$ is the initial retroreflectance of the traffic marking system, $R_{cex}$ is the retroreflectance of the comparative example, and $R_{cex,0}$ is the initial retroreflectance of the comparative example. An R value of 1.0 means that the retroreflectance of the traffic marking system of the current invention is changing at the same rate as that of the comparative control. An R value greater than 1.0 means that the retroreflectance of the traffic marking system of the current invention is decreasing at a slower rate than that of the comparative control, which means that the traffic marking system of the present invention has a longer lifetime than those of the current art.

TABLE 3.1

Durability Testing Results - Description of systems

| Coating Systems | TMS1 | TMS2 | TMS3 | TMS4 | C.Ex1[a] | C.Ex2[a] | C.Ex3[a] | C.Ex4[a] |
|---|---|---|---|---|---|---|---|---|
| aqueous paint | P1 | P1 | P1 | P2 | P1 | P1 | P1 | P2 |
| reflective beads | L-511[b] | L-511 | L-511 | L-511 | L-511 | L-511 | L-511 | L-511 |
| clear coating | CC1 | CC3 | CC2 | CC2 | — | — | — | — |

[a]C.Ex = Comparative Example
[b]L-511 VISIBEADS ™

TABLE 3.2

Durability Testing Results - R values

| Traffic marking system Comparative example | TMS1 C.Ex1[a] | TMS2 C.Ex2[a] | TMS3 C.Ex3[a] | TMS4 C.Ex4[a] |
|---|---|---|---|---|
| Days: 2 | 1.0 | 1.0 | 1.0 | 1.0 |
| 17 | 1.0 | 1.1 | 0.8 | 1.1 |
| 100 | 1.0 | 1.1 | 0.8 | 1.1 |
| 228 | 1.4 | 2.7 | 2.1 | 1.0 |
| 347 | 2.9 | 4.8 | 4.3 | 1.5 |

[a]C.Ex = Comparative Example

The results above show that the traffic marking systems of the current invention are superior to those of the current art in that they lose their retroreflectance at a slower rate.

I claim:

1. A composite on a surface of a substrate, wherein said composite consists essentially of:
   a) a first coating comprising pigment and binder polymer, wherein, when applied to said substrate, said first coating contains from 40% to 80% volume solids; wherein said first coating is a fast dry coating;
   b) reflective beads; and
   c) a clear coating, comprising binder polymer; wherein, when applied to said substrate, said clear coating contains from 10% to 50% volume solids; wherein said surface of said substrate is a road surface, and said composite is a traffic marking;
   wherein the ratio of the diameter of said reflective bead to the wet film thickness of said first coating is between 2.0 and 10.0;
   wherein the ratio of the diameter of said reflective bead to the dry film thickness of said clear coating is between 0.5 and 3.0.

2. The composite of claim 1, wherein said binder polymer has a glass transition temperature of −10° C. to 70° C.

3. The composite of claim 1, wherein said clear coating has a percent visible light transmission of 80 to 100% when measured at a coating thickness of 500 microns.

4. The composite of claim 1, wherein said clear coating has a percent visible light transmission of 85 to 100% when measured at a coating thickness of 500 microns.

5. The composite of claim 1, wherein said clear coating has a percent visible light transmission of 90 to 100% when measured at a coating thickness of 500 microns.

6. The composite of claim 1, wherein said reflective beads are spherical, or approximately spherical glass beads.

7. The composite of claim 1, further comprising at least one absorber,
   wherein said absorber is selected from the group consisting of organic super absorbent polymers, ion-exchange resins, hollow sphere polymers, molecular sieves, tales, inorganic absorbers, porous carbonaceous materials, non-porous carbonaceous materials, and mixtures thereof.

* * * * *